(12) United States Patent  
Butts

(10) Patent No.: US 6,904,807 B1
(45) Date of Patent: Jun. 14, 2005

(54) SHAKERS AND METHODS OF TESTING

(75) Inventor: Gary C. Butts, Huntington Beach, CA (US)

(73) Assignee: Labworks, Inc., Costa Mesa, CA (US)

( * ) Notice: Subject to any disclaimer, the term of this patent is extended or adjusted under 35 U.S.C. 154(b) by 0 days.

(21) Appl. No.: 10/727,755

(22) Filed: Dec. 4, 2003

(51) Int. Cl.[7] .............................................. G01M 7/00
(52) U.S. Cl. ....................................... 73/662; 663/668
(58) Field of Search ......................... 73/662, 571, 663, 73/865.6, 664, 665, 666, 667, 668

(56) References Cited

U.S. PATENT DOCUMENTS

| | | | | |
|---|---|---|---|---|
| 5,351,545 A | * | 10/1994 | Lucas ........................... | 73/663 |
| 5,449,985 A | * | 9/1995 | Kanemitsu et al. .......... | 318/128 |
| 5,544,528 A | * | 8/1996 | Woyski et al. ................ | 73/665 |
| 5,594,177 A | * | 1/1997 | Hanse .......................... | 73/663 |
| 5,724,893 A | * | 3/1998 | Lee et al. ..................... | 108/20 |
| 5,969,256 A | * | 10/1999 | Hobbs .......................... | 73/663 |
| 6,044,709 A | * | 4/2000 | Briggs et al. ................. | 73/663 |
| 6,131,461 A | * | 10/2000 | Leist ............................ | 73/662 |
| 6,341,258 B1 | * | 1/2002 | Inoue et al. .................. | 702/56 |
| 6,446,508 B1 | * | 9/2002 | Peterson et al. ............. | 73/571 |

* cited by examiner

Primary Examiner—Hezron Williams
Assistant Examiner—Jacques M. Saint-Surin
(74) Attorney, Agent, or Firm—Blakely, Sokoloff, Taylor & Zafman LLP

(57) ABSTRACT

Shakers and methods of testing suitable for various applications, including those presenting adverse test environments. The shakers have a permanent magnet assembly mounted in a sealed housing for vibration along a shaker axis. The permanent magnet assembly is double ended, and includes at least one shorting ring to hold down the inductance of the driving coils at higher frequencies. Fluid cooling (or heating) of both the shaker housing and the permanent magnet assembly allows placement of the shakers inside a temperature test chamber. The shakers may be coupled directly to the article to be tested, or coupled singularly or in a plurality to a test table to which an article to be tested is coupled. Various embodiments and methods of testing are disclosed.

20 Claims, 5 Drawing Sheets

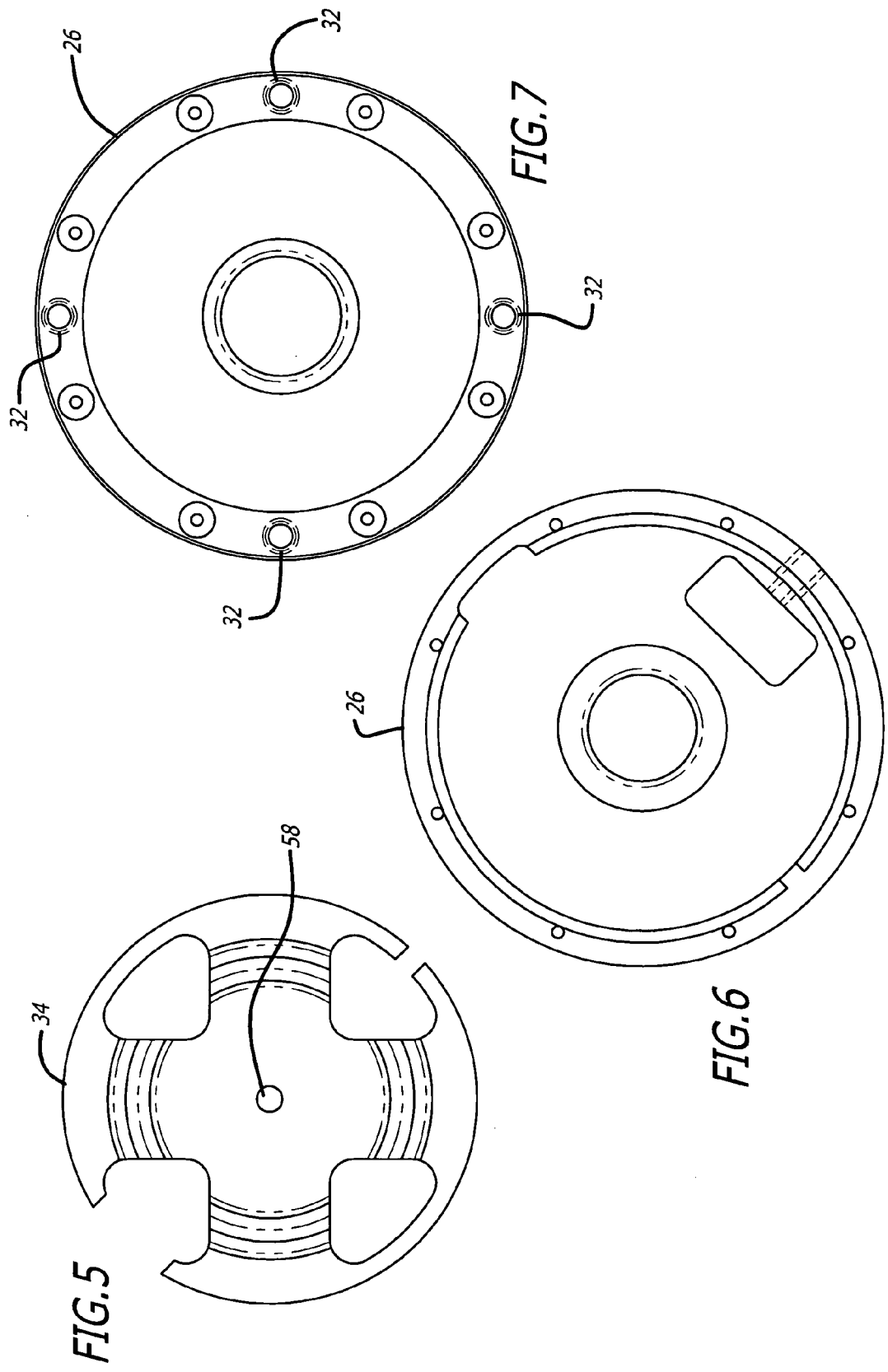

SHAKERS AND METHODS OF TESTING

BACKGROUND OF THE INVENTION

1. Field of the Invention

The present invention relates to the field of vibration test equipment and vibration testing.

2. Prior Art

Vibration testing and equipment for such testing is well known in the prior art. The purpose of such testing varies from making sure that a product will operate properly in whatever vibration environment it will experience in normal use to simply assuring that the product will not be damaged by vibration levels that may be encountered during transportation of the product to its final destination. Thus in some cases the product being tested, such as a mechanical, electromechanical or electronic product, may be tested in operation, whereas in other cases, such as by way of example testing of home appliances, the product being tested when not operated, and in still other cases of course, a mechanical assembly may have no moving parts but still must meet minimum vibration capability requirements for shipping and/or the vibration environment in which the product will be used. Finally, of course, the size of products so tested can range from very small to very large, with the testing preferably being conducted over some appropriate temperature range equaling or exceeding the temperature range it is expected to experience in shipping and/or use.

Conventional shakers typically have a rigidly mounted housing having a relatively large permanent magnet therein. A plate-like shaker platform typically projects above the housing, the platform having a voice coil type electromagnetic drive extending downward into the air gap of the magnetic circuit, with the shaker table and voice coil assembly mounted on flexure members so as to be capable of vibrating relative to the housing, preferably with minimal rotation about axes perpendicular to the axis of vibration. Thus such shakers are functionally similar to voice coil shakers, though proportions, rigidities, etc. are quite different.

Such prior art shakers work well when properly used, though typically have certain characteristics which limit their application and the efficiency of their use. By way of example, such shakers normally are not sealed devices to better facilitate cooling of the voice coil. Because of this, they can accumulate dirt and moisture, limiting their utility when regularly used in an uncontrolled environment or in testing over a temperature range particularly in low temperatures. Also many items to be tested, such as home appliances like refrigerators, etc. are too large to be fastened to a shaker table of even what would be considered a large shaker. In particular, conventional shaker armature suspension systems limit the size of the test specimen and/or increase the complexity of the test fixturing required for larger or heavier test specimens. Although conventional shaker suspensions are made as stiff as possible in the lateral directions, their lateral stiffness is limited by the need to reduce the axial (normal vibration axis) armature suspension stiffness so as not to affect the axial vibration force requirements and to provide adequate amplitudes of vibration for low frequency testing. During normal axial vibration test excitation, off-center loading or unsymmetrical stiffness components of the test specimen necessarily result in some lateral or rotational vibration motion. Due to the extremely close tolerances involved with the voice coil, these lateral vibration components can result in internal shaker mechanical component contact and subsequent damage to the shaker. This situation often results in severe limitations on the size or weight of the test specimen that can be tested on a given shaker. Very often, the shaker size must be increased solely to accommodate a large or heavy test specimen, even when the vibratory force required is low. Since with the present invention shaker, the test load is not attached to the moving element, it cannot create relative lateral motion between the armature and the coil. Thus with the present invention shaker, the above problems are eliminated.

Some prior art shakers have been designed in an attempt to overcome some of these limitations. By way of example, shakers are known which are sealed, making them more suitable for use in uncontrolled environments. However, none of these shakers have the combination of features of the present invention.

BRIEF DESCRIPTION OF THE DRAWINGS

FIG. 5 is a face view of a flexure used in a shaker in accordance with FIGS. 3 and 4.

FIG. 6 is a first (inside) face view of a shaker housing cap used in a shaker in accordance with FIGS. 3 and 4.

FIG. 7 is a second (outside) face view of a shaker housing cap used in a shaker in accordance with FIGS. 3 and 4.

DETAILED DESCRIPTION OF THE PREFERRED EMBODIMENTS

Figure 1:
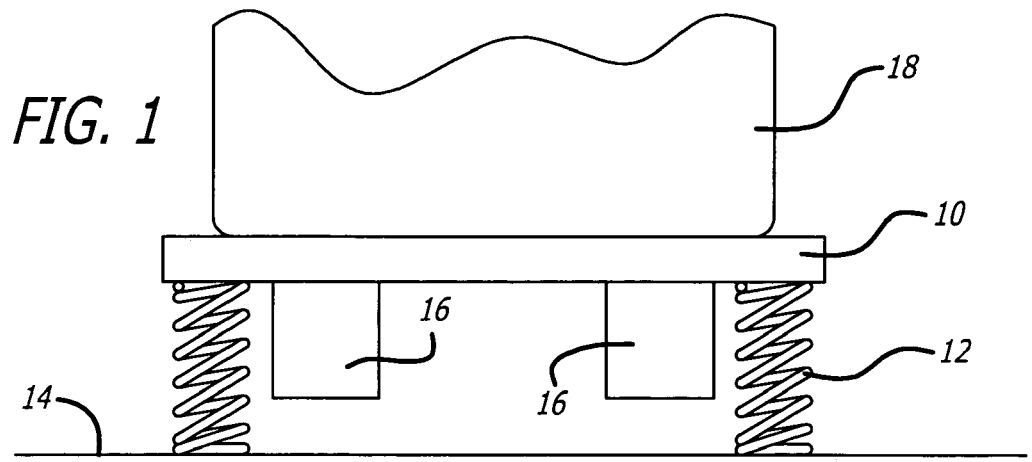
FIGS. 1 and 2 are a schematic side view and a top view, respectively, of shakers and a shaker table in accordance with the present invention.
Figure 2:
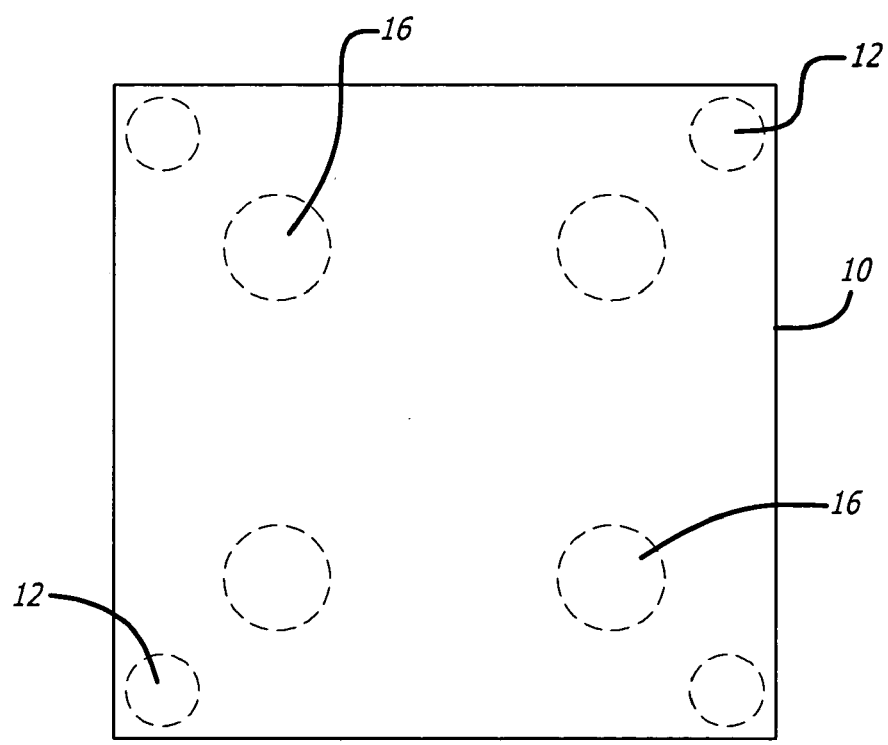

The present invention comprises a sealed, liquid-cooled shaker not having a conventional shaker table to which an article to be tested is placed, but rather having a housing to which the vibratory forces are coupled. Thus the housing of one or more such shakers, each of which may be substantially smaller than the article to be tested, may be coupled directly to the article to be tested, or alternatively may be coupled singularly or in plurality to a suitable table or platform to which the article to be tested is connected. By way of example, referring to FIG. 1, a table 10 supported by coil springs 12 on a suitable support surface 14 is schematically illustrated. Here a plurality of shakers 16, four in this specific embodiment (see FIG. 2 also), are used to impart vibratory forces to the table 10 and thus to the object 18 being tested. Since each shaker is, capable of generating very substantial vibratory forces for its size and frequently large objects are only tested at relatively low G levels, the object being tested may be much larger than the shakers themselves, with the shakers used in adequate numbers to provide the total vibratory force desired. Also, because the vibratory force of a plurality of shakers is distributed about an area, the table 20 need not be as rigid as it might otherwise need to be if a less distributed vibratory force was used. Typically, such tables are made out of the aluminum, usually relieved in certain areas to reduce weight without significantly sacrificing rigidity, though other preferably lightweight materials might also be used, depending on the application.

Figure 3:
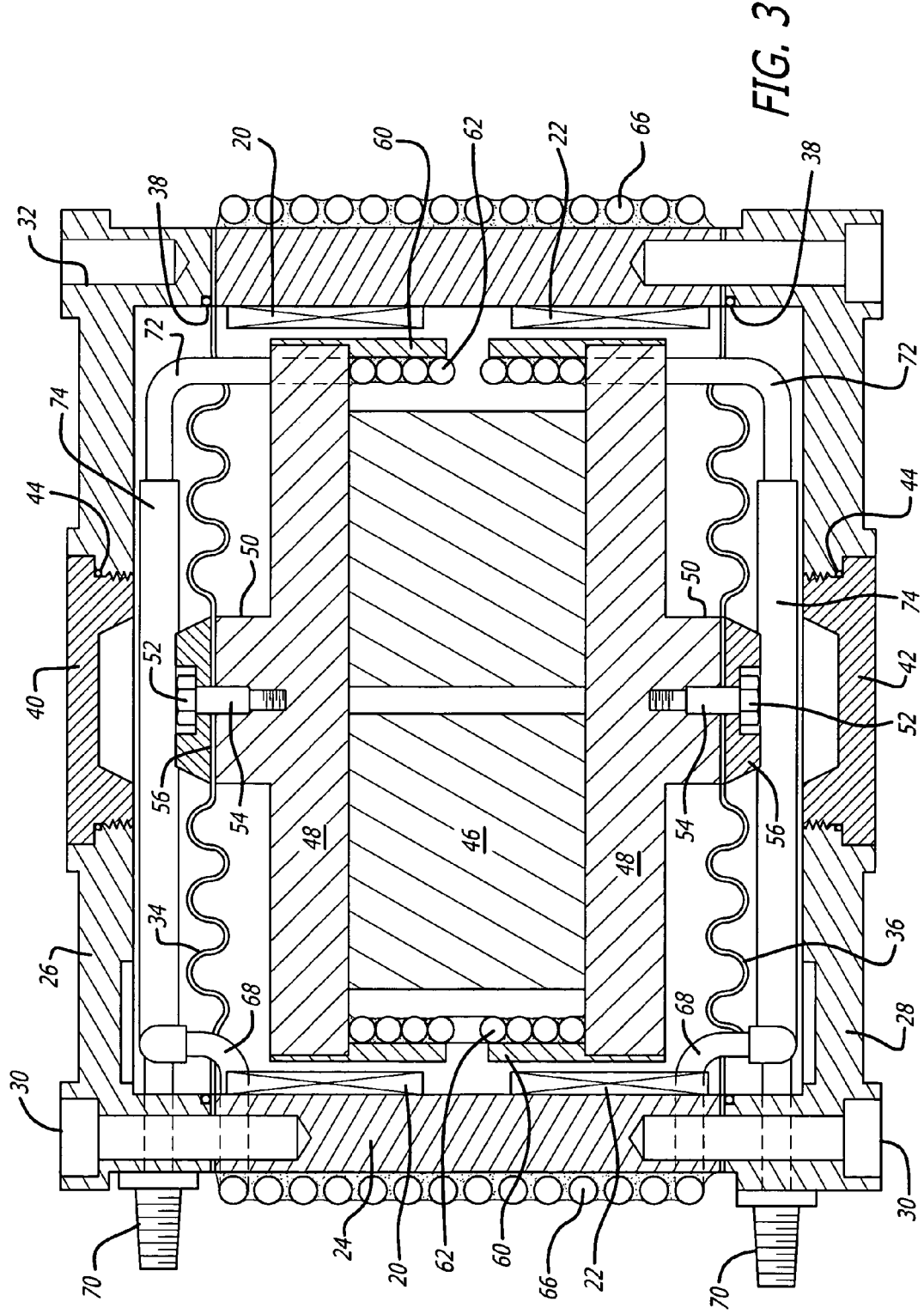
FIG. 3 is a side cross-sectional view of a shaker in accordance with the present invention.
Figure 4:
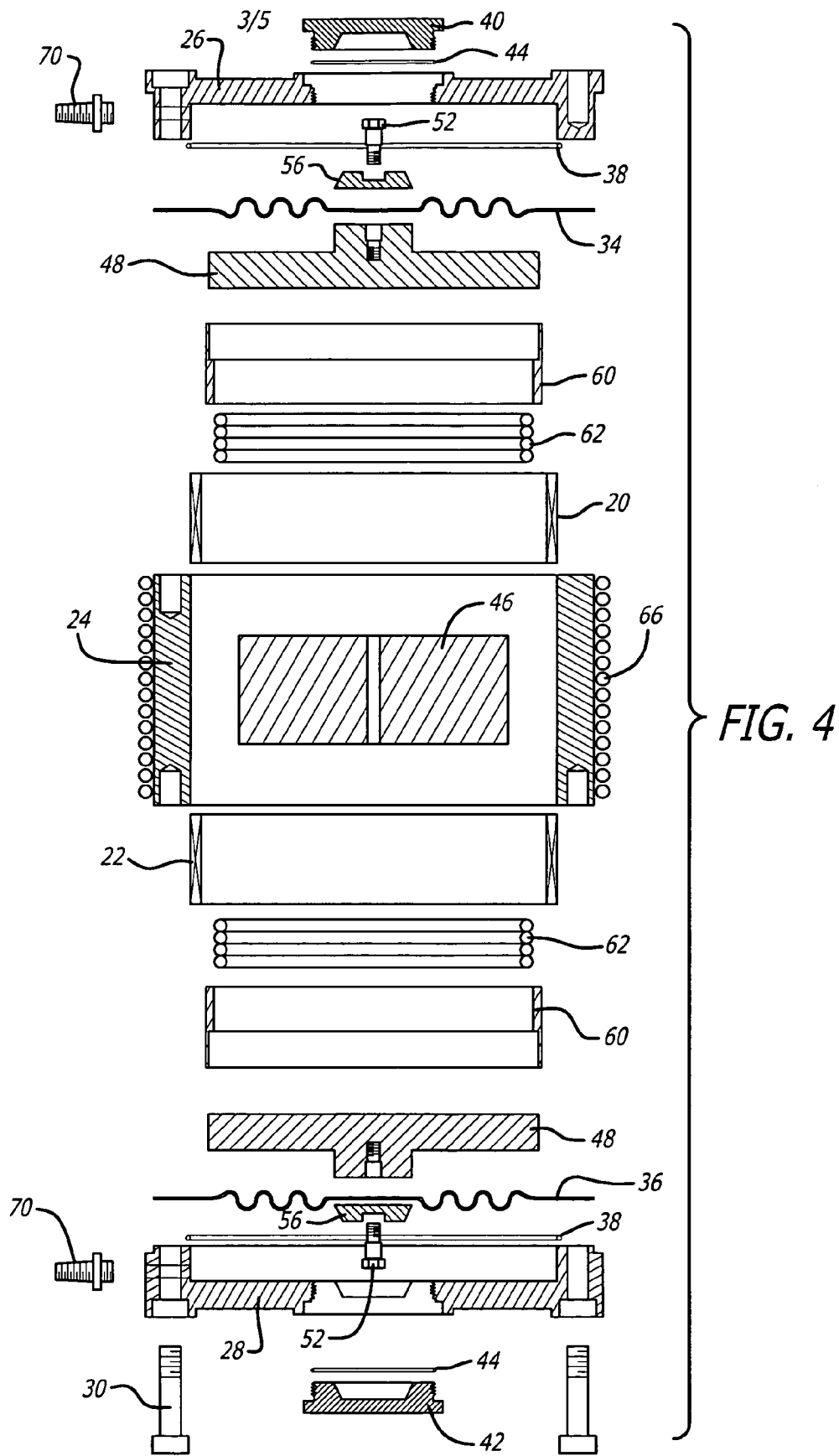
FIG. 4 is an exploded view of the shaker of FIG. 3.

Now referring to FIGS. 3 and 4, a cross-sectional view and an exploded cross-sectional view of an exemplary embodiment of the shaker in accordance with the present invention may be seen. In the shakers of the present invention, two voice coils 20 and 22 are bonded to the inner periphery of center housing member 24. The top and bottom of the housing is enclosed by top and bottom housing caps 26 and 28, bolted to the center housing member 24 by bolts 30. In addition, at least one of the top and bottom housing caps has a plurality of threaded blind holes 32 therein (see also FIGS. 6 and 7) that may be used for bolting the shaker to a table such as that shown in FIGS. 1 and 2, or perhaps in some cases, directly to the product or item to be tested. While only a single threaded hole 32 is shown in the drawing of FIG. 3, four such holes are shown in FIG. 7, though of course any number and/or pattern may be used as desired. Further, alternate attachment means may also be used, though bolting to a shaker table or an object to be tested in this manner is preferred because of the potential rigidity of the attachment.

Trapped between the top housing cap 26 and the center housing member 24 is a flexure 34, a face view of which may be seen in FIG. 5. A similar flexure member 36 has its outer periphery trapped between lower housing cap 28 and center housing member 24, with o-ring seals 38 preventing moisture from entering the shaker enclosure. The top housing cap 26 and the lower housing cap 28 have center removable plugs 40 and 42, with O-rings 44 sealing this portion of the shaker enclosure. As shall subsequently be seen, the center removable plugs 40 and 42 are provided for alignment purposes during assembly of the shaker and otherwise normally are not thereafter removed, unless for some reason the shaker is disassembled at a later date.

The flexure members 34 and 36 support a magnet assembly comprising permanent magnet 46, magnetized in an axial direction (vertical with the orientation shown in FIGS. 3 and 4), pole pieces 48, shorting rings 60 and cooling coils 62. As is known in the art, the shorting rings, typically a good electrical conductor, copper being preferred, reduce the inductance of the driving coils at higher frequencies to enable the ample excitation of the driving coils when vibration testing at higher frequencies without requiring very high driving voltages. For assembly, the shorting rings 60 are epoxy bonded or soldered to the pole pieces 48, and the cooling coils 62 are bonded to the shorting rings. Then the pole pieces are epoxy bonded to the magnet in an appropriate fixture for obtaining permanent coaxial and concentric alignment of the magnet and pole pieces. Each pole piece 48 has an integral coaxial and concentric cylindrical protrusion 50 that gives the magnet assembly the same height as the center housing member 24. Each pole piece also has a concentric threaded center hole for receiving bolts 52 having a cylindrical shank 54 sliding within close fitting holes in protrusions 50 and caps 56. Because of the concentricity of the various parts of the permanent magnet assembly and the accurate location of the various parts with respect to each other, the permanent magnet assembly may be centered in the housing during assembly by an appropriate alignment fixture extending through the opening in the upper and lower housing caps 26 and 28 before plugs 40 and 42 are put in position. Such a fixture establishes concentricity of the entire magnet assembly with the housing by establishing such concentricity of the caps 56 before bolts 52 are tightened. In that regard, the hole 58 (see FIG. 5) at the center of each flexure is intentionally made somewhat larger than the diameter of the shank of bolt 52 to allow the establishment of the desired concentricity while the flexures remain undeflected, at least in a radial direction.

The present invention is intended to provide high vibratory forces for the size of the shaker and to be suitable for use in adverse environments (dust, dirt, moisture, etc.) and in extreme temperature environments (both hot and cold). When generating high vibratory forces, the high currents in the driving coils 20 and 22 cause substantial power dissipation in the coils because of the resistance of the coils, thereby heating the center housing member 24. Also eddie currents in the shorting coils 60 on the permanent magnet assembly cause substantial energy loss and heat generation, particularly at higher frequencies. These areas of the shakers of the present invention are cooled by liquid pumped through coils 62 on the shorting rings and coils 66 on the periphery of the center housing member 24. While the coils 66 are on the outer periphery of the central housing member 24, in the preferred embodiment the ends 68 of coils 66 extend through and are sealed with respect to the upper and lower regions of the central housing member 24, and are coupled within the shaker to the inside end of a standard pipe fitting 70. Similarly, the ends 72 of coils 62 (one continuous tube) extend through holes in the pole pieces 48 to be coupled by way of flexible tubes 74 to pipe fittings 70. Thus the tubing forming coils 66 and the tubing forming coils 62 are connected in parallel to the pipe fittings 70 so that both are provided with a flow of cooling fluid through the pipe fittings 70 rigidly mounted on the sides of the top and bottom caps 26 and 28.

In the embodiment shown, the shorting rings 60 have a thin region bonded to the periphery of the pole pieces 48. This is mainly an attachment expedient, though other forms and places of attachment could be used. Also while the shorting rings are adjacent the coils fastened to the inside of the center housing member 24, they are not perfectly center on the coils. However, the lack of centering is symmetrical, so that the coupling from the coils to the shorting rings is substantially constant throughout the stroke of the permanent magnet assembly.

The cooling fluid used may be water, a mixture of water and antifreeze such as ethylene glycol, an oil, or other fluids as desired, typically with the cooling fluid being cooled before being recirculated through the shaker. The ability to cool the shaker in the region of the energy dissipating parts of the shaker, while not always needed, provides the ability to prevent overheating of shaker components, particularly when testing at elevated temperatures and high power levels. It may also be useful in some instances for lower temperature testing to prevent the shaker heat generation from disturbing the temperature of the test environment. Thus by way of example, for low temperature testing, one might use controlled circulation of even lower temperature fluid for cooling of the shaker to remove substantially all the heat generated by the operation of the shaker so that the shaker will have substantially no net effect on the test environment. Also in situations where it is desired to have the shaker stabilized at the test environment temperature, it may be useful to provide the cooling liquid to heat or cool the shaker before the same is operated to reduce the time required for the shaker itself to reach the temperature of the test environment. In particular, the permanent magnet assembly in a shaker of even moderate size in accordance with the present invention has substantial thermal capacity and relatively weak heat flow paths to the outside world, except as provided by the cooling coils 62. Consequently the thermal time constant of the magnet assembly would be very long without the ability to cool or heat the magnet assembly to directly predetermine its temperature. Also, many of the higher energy permanent magnet materials lose their magnetism at elevated temperatures and can even be permanently demagnetized if subjected to high enough temperatures. The liquid cooling coils located on the present shaker shorted turns serve to also cool the magnet by way of the end pole plates. This not only guards against loss of force with increasing temperature, but insures against catastrophic demagnetization of the permanent magnet.

In the preferred embodiment as disclosed herein, the cooling coils for the housing and for the magnet assembly are coupled in parallel so that only two fluid connections are used. As an alternative however, the two sets of coiling coils may each have their own fluid connections. This could allow operating the shaker with the permanent magnet assembly and the shaker housing at different temperatures. By way of example, because of the thermal contact between the shaker and the table (or test object) it is fastened to, and the thermal contact between the table and the test object, it may be necessary or desirable to cause the shaker housing to reach and operate at the test temperature, but for high test temperatures, to maintain the permanent magnet assembly at a lower temperature. This would avoid temperature gradients in the test object, and at the same time, protect the permanent magnet from high temperature exposure.

Shakers in accordance with the present invention may be fabricated in a wide range of sizes, though the ability to provide a high vibratory force for a given size of shaker, together with the ability to use multiple shakers to shake a test table much larger than any one shaker makes testing of large objects with much smaller shakers possible. This is to be compared to conventional shakers with a fixed housing and a vibratory table, wherein a massive shaker may be required to test the same large objects.

The present invention shakers have a combination of features which make the shakers suitable for use in many applications. By way of example, in a conventional voice coil shaker having a voice coil/table assembly mounted for vibration along the axis of the shaker housing and permanent magnet, the object to be vibration tested is normally clamped or bolted to the table. This increases both the suspended mass and the moment of inertia of the suspended mass about axes perpendicular to the axis of the shaker housing. Consequently, off-center loads on the shaker table induce rotation of the suspended mass about axes perpendicular to the shaker housing, with the natural frequency of the suspension being relatively low because of the high moment of inertia of the total suspended mass. Consequently, voice coil shakers are particularly sensitive to off-center loads and can be permanently damaged by off-center loads when the voice coil rubs on the permanent magnet pole or housing. In the present invention, however, the suspended mass and moments of inertia thereof are fixed, independent of the moments of inertia of the object being tested. Thus the present invention shakers are much more tolerant to off center test specimens. This, in combination with the fact that the shakers are sealed, makes the present invention shakers well suited for use in such adverse environments as on production lines, in environmental chambers and the like, as they are unaffected by dirt and moisture, and with the cooling, can be operated for long periods at high output and/or at high temperatures without overheating, and particularly without overheating the permanent magnet. In that regard, the general symmetry of the shakers of the preferred embodiment wherein a circular housing body with identical end caps and symmetrical double-ended permanent magnet assembly and convoluted support diaphragms provide both high vibratory forces and reduced manufacturing costs.

Figure 8:
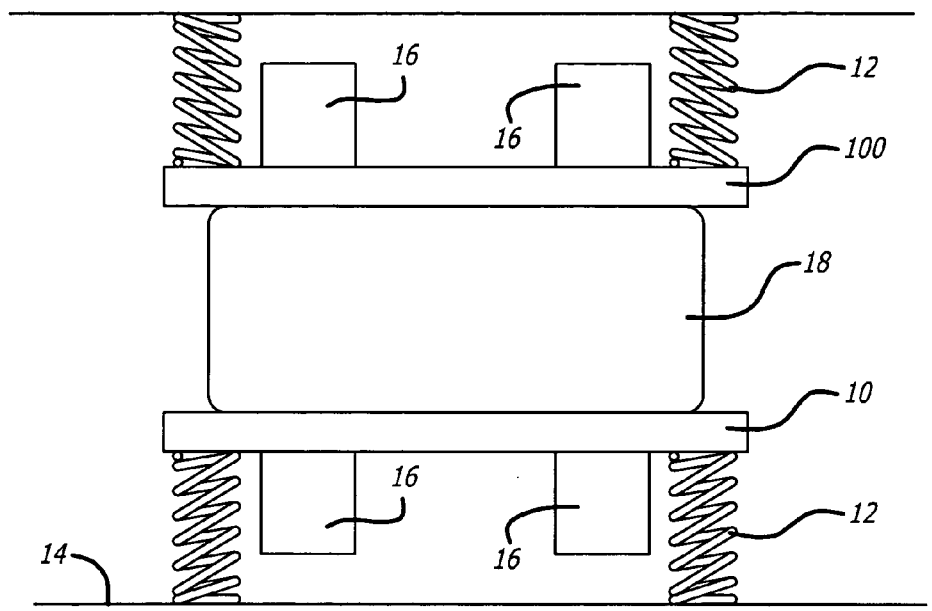
FIG. 8 illustrates an alternate way of coupling an article to be tested to the shaker table.

For such testing as production line testing of some manufactured assembly, such testing is normally done at relatively low G values. To facilitate the quick coupling of the shaker table 10 (see FIG. 8) to the article 18 to be vibration tested, a spring mounted retainer 100 might be lowered to hold the article 18 to be tested against table 10 during the testing. Though a simple flat plate retainer 100 is depicted in FIG. 8, the retainer, as well as table 10, might be configured to simulate the support of the article when packaged for shipment. By way of example, some articles are shipped in larger boxes, being supported within the box by Styrofoam corner support members. Table 10 and retainer 100 could easily be configured to support the article during vibration testing in substantially the same way. Such coupling of the vibration table and the article to be tested could be much faster than using clamps or bolts, and at the same time, much more representative of the actual shipping support and vibration environment. The retainer 100 may also have one or more shakers 12 fastened to the retainer, as shown in FIG. 8 if additional shaker force is required.

Figure 9:
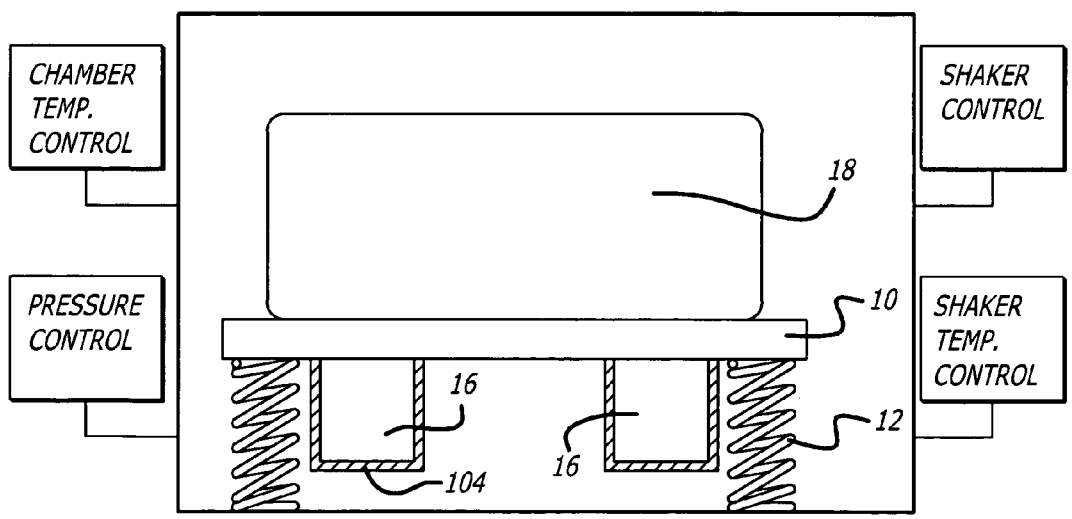
FIG. 9 illustrates the use of the present invention shakers and shaker table entirely within an environmental chamber.

Also, because the present invention shakers are sealed and can be fluid cooled, the shaker 16 as well as shaker table 10 can actually be placed within a test chamber 102 (see FIG. 9). Such chambers can be sealed for testing at various pressures other than atmospheric, and/or insulated for testing at various temperatures other than ambient. This is to be compared to temperature testing using prior art shakers wherein the shaker is not in the test chamber, but rather the article to be tested as fastened to the shaker table projects through the open bottom of the test chamber. Thus, large thermal gradients are usually assured, and if testing at any different pressures is to be achieved, the pressure chamber itself would need to be mounted on the shaker table and shaken along with the article being tested.

As shown in FIG. 9, a typical test chamber using the present invention would have the shaker table 10, the compliant mount 12 therefor, the shakers 16 fastened to the shaker table and the article 18 to be tested all within the test chamber. In addition to the normal shaker control provided to the shakers 16, a shaker temperature control circulating fluid through the cooling coils of the shakers 16 may also be supplied. Particularly for high temperature testing, it may be desirable or necessary to actually cool the shakers 16 to a temperature substantially below the temperature set for the test chamber. For this purpose, shakers 16 may have thermal insulation 104 provided around them, and might also be thermally insulated from table 10 by a layer of rigid thermal insulation. The chamber 102 may also have a chamber temperature control, hot or cold or both, and may also be adequately sealed if desired for pressure control.

Figure 10:
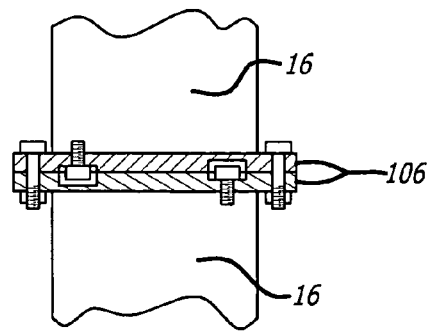
FIG. 10 illustrates the coupling of two shakers together.

Now referring to FIG. 10, an alternate embodiment of the present invention may be seen. Here two shakers 16 are bolted together coaxially, or end to end, using adapter rings 106. In many cases, it may be preferable to distribute the vibratory force over a larger area, as in FIGS. 1 and 2, though for heavy concentrated articles to be vibrated, a pair (or more) of shakers may be coupled as shown in FIG. 10, and/or multiple pairs coupled in this way may be used in a distributed fashion (see FIGS. 1 and 2 for reference).

While certain preferred embodiments of the present invention have been disclosed and described herein, it will be understood by those skilled in the art that various changes in form and detail may be made therein without departing from the spirit and scope of the invention. Similarly, the various aspects of the present invention may be advantageously practiced by incorporating all features.

What is claimed is:

1. A shaker comprising:
   a sealed shaker housing
   a permanent magnet assembly supported within the housing for vibratory translation along an axis of the permanent magnet assembly, the permanent magnet assembly having a permanent magnet magnetized parallel to the axis, and first and second pole pieces spaced apart along the axis at first and second ends of the permanent magnet;
   first and second wire coils spaced adjacent and outward from a periphery of the first and second pole pieces, respectively, and secured to an inner wall of the shaker housing;
   the permanent magnet assembly having at least one electrically conductive shorting ring supported on the permanent magnet assembly adjacent at least one of the wire coils;
   a first tubular coil fastened to the permanent magnet assembly and flexibly coupled to ports on the shaker housing through which a fluid may be circulated for heating or cooling of the permanent magnet assembly;
   a second tubular coil fastened to the shaker housing and coupled to ports on the shaker housing through which a fluid may be circulated for heating or cooling of the permanent magnet assembly;
   the shaker housing being adapted for coupling to a shaker table or an article to be tested.

2. The shaker of claim 1 wherein the first tubular coil and the second tubular coil are coupled in parallel.

3. The shaker of claim 1 wherein the at least one electrically conductive shorting ring is comprised of first and second shorting rings, each being supported on the permanent magnet assembly adjacent a respective one of the wire coils.

4. The shaker of claim 3 wherein the first tubular coil comprises first and second first tubular coil sections connected in series, each coupled to a respective one of the first and second shorting rings.

5. The shaker of claim 4 wherein the first and second first tubular coil sections are formed from a single length of tubing.

6. The shaker of claim 1 wherein the second tubular coil is fastened to the external periphery of the housing adjacent the wire coils.

7. The shaker of claim 1 wherein the permanent magnet assembly is supported within the housing on convoluted epoxy graphite laminate diaphragms.

8. The shaker of claim 1 wherein opposite faces of the shaker housing are adapted for coupling to a shaker table or an article to be tested.

9. The shaker of claim 8 further comprised of an adapter configured to be fastened to one face of the shaker and to be fastenable to a second adapter fastened to an identical shaker.

10. First and second shakers, each in accordance with claim 9, the first and second shakers being fastened together with the axes of the permanent magnet assemblies being coaxial.

11. A shaker comprising:
    a sealed shaker housing having a round housing body defining a shaker axis, and first and second end caps;
    a permanent magnet assembly supported within the housing for vibratory translation along the shaker axis, the permanent magnet assembly having a cylindrical permanent magnet magnetized in a direction parallel to the shaker axis, and first and second pole pieces spaced apart along the shaker axis and abutting first and second ends of the permanent magnet;
    first and second wire coils spaced adjacent and outward from a periphery of the first and second pole pieces, respectively, and secured to an inner wall of the shaker housing;
    the permanent magnet assembly having at least one electrically conductive shorting ring supported on the permanent magnet assembly adjacent at least one of the wire coils;
    a first tubular coil fastened to the permanent magnet assembly and flexibly coupled to ports on the shaker housing through which a fluid may be circulated for heating or cooling of the permanent magnet assembly;
    a second tubular coil fastened to the shaker housing and coupled to ports on the shaker housing through which a fluid may be circulated for heating or cooling of the permanent magnet assembly;
    the shaker housing being adapted for coupling to a shaker table or an article to be tested.

12. The shaker of claim 11 wherein the first tubular coil and the second tubular coil are coupled in parallel.

13. The shaker of claim 11 wherein the at least one electrically conductive shorting ring is comprised of first and second shorting rings, each being supported on the permanent magnet assembly adjacent a respective one of the wire coils.

14. The shaker of claim 13 wherein the first tubular coil comprises first and second first tubular coil sections connected in series, each coupled to a respective one of the first and second shorting rings.

15. The shaker of claim 14 wherein the first and second first tubular coil sections are formed from a single length of tubing.

16. The shaker of claim 11 wherein the second tubular coil is fastened to the external periphery of the housing adjacent the wire coils.

17. The shaker of claim 11 wherein the permanent magnet assembly is supported within the housing on convoluted epoxy graphite laminate diaphragms.

18. The shaker of claim 11 wherein opposite faces of the end caps are adapted for coupling to a shaker table or an article to be tested.

19. The shaker of claim 18 further comprised of an adapter configured to be fastened to one face of the shaker housing and to be fastenable to a second adapter fastened to a similar shaker.

20. First and second shakers, each in accordance with claim 19, the first and second shakers being fastened together with the axes of the permanent magnet assemblies being coaxial.

* * * * *